(12) United States Patent
Wu et al.

(10) Patent No.: US 7,592,857 B2
(45) Date of Patent: Sep. 22, 2009

(54) CHARGE PUMP CIRCUIT

(75) Inventors: Che-Ming Wu, Dongshi Town (TW); Ying-Feng Wu, Heping Shiang (TW)

(73) Assignee: G-Time Electronic Co., Ltd., Hsinchu (TW)

( * ) Notice: Subject to any disclaimer, the term of this patent is extended or adjusted under 35 U.S.C. 154(b) by 0 days.

(21) Appl. No.: 12/003,255

(22) Filed: Dec. 21, 2007

(65) Prior Publication Data

US 2009/0160532 A1 Jun. 25, 2009

(51) Int. Cl.
*G05F 1/10* (2006.01)
(52) U.S. Cl. .................................................. 327/536
(58) Field of Classification Search ......... 327/535–538, 327/540, 541, 543
See application file for complete search history.

(56) References Cited

U.S. PATENT DOCUMENTS

| | | | | |
|---|---|---|---|---|
| 5,499,183 | A * | 3/1996 | Kobatake | 363/59 |
| 5,801,934 | A * | 9/1998 | Lacey et al. | 363/60 |
| 5,912,560 | A * | 6/1999 | Pasternak | 324/536 |
| 6,157,242 | A * | 12/2000 | Fukui | 327/536 |
| 6,605,985 | B2 * | 8/2003 | Pagliato et al. | 327/536 |
| 6,614,699 | B2 * | 9/2003 | Tanzawa | 365/189.11 |
| 6,781,440 | B2 * | 8/2004 | Huang | 327/537 |
| 6,838,909 | B2 * | 1/2005 | Huang et al. | 326/95 |
| 7,394,314 | B2 * | 7/2008 | May | 330/251 |

\* cited by examiner

*Primary Examiner*—Lincoln Donovan
*Assistant Examiner*—Hai L. Nguyen
(74) *Attorney, Agent, or Firm*—Wang Law Firm, Inc.; Li K. Wang

(57) ABSTRACT

A charge-pump circuit without reverse current is disclosed. The charge-pump circuit includes: several diode equivalent networks connecting in series, between any two of adjacent diode equivalent networks having a node with a corresponding voltage-boost level, wherein the low voltage end in the diode equivalent network with lowest voltage-boost level is the input of the charge-pump circuit, and the input receives an input voltage signal; a voltage-boost capacitor network having an end to electronically couple to one of the node and the other end to electronically couple to a pulse signal, wherein the pulse signal has a high-voltage level and a low-voltage level to raise a voltage level at the node with voltage-boost as high-voltage level and low-voltage level switches; and a reverse current cut-off circuit electronically coupled to the diode equivalent networks to enable and disable the diode equivalent networks, wherein the reverse current cut-off circuit has two conductive paths.

17 Claims, 7 Drawing Sheets

CHARGE PUMP CIRCUIT

BACKGROUND OF THE INVENTION

1. Field of the Invention

The present invention relates to a charge pump circuit, and more especially, to a charge-pump circuit using a reverse current cut-off circuit to improve the electronic efficiency and reliability.

2. Background of the Related Art

In recent years, such a charge pump circuit has been used frequently as a power supply circuit capable of outputting a voltage higher than an input voltage without using an inductor, and supplying a power supply voltage to a load requiring a relatively small consumption current. FIG. 1 shows a circuit diagram of conventional dual phase charge pump circuit. The charge pump circuit includes a diode-connected NMOS transistor and number of capacitors. The diode-connected NMOS transistor has a threshold voltage and connects to a node where two NMOS transistors couples with. The circuit's operation is that the circuit has two inverse impulse signals $\phi 1$ and $\phi 2$ to charge capacitors for the purpose of raising voltage. According to the conductive path the circuit's clock cycle has a setup period and a pumping period. In the setup period, the pulse signal $\phi 1$ is low level, and the dual phase charge pump circuit 100 turns on the first charging path 110, then the NMOS transistor is turned on for raising the voltage of first node 120 to Vin−Vt, and the voltage of capacitor C1 is charged to Vin−Vt. In the pumping period, the pulse signal $\phi 1$ is high level to V$\phi$, and the voltage of capacitor C1 is at same level V$\phi$ to raise the voltage of first node 120 to Vin+(V$\phi$−Vt). When the first node's 120 voltage is higher than the threshold voltage Vt in the NMOS transistor, the second charging path 130 is closed to raise the voltage of the second node 130 to Vin+(V$\phi$−Vt)−Vt. Reasonably, at next period the voltage of the second node 130 is going to Vin+2(V$\phi$−Vt).

To summarize, a dual phase charge pump circuit with n nodes has the output voltage shown in equation (1-1)

$$Vout = Vin + N*(V\phi - Vt) - Vt \tag{1-1}$$

From equation 1-1, because the effect of the MOS's characteristic of threshold voltage, the charging efficiency in the dual phase charge pump circuit 100 is decreased, thus causing inefficiency for the system. Especially in low power supply condition, the threshold voltage has great effect on the operation of the dual phase charge pump circuit. In some applications, the inefficiency of the dual phase charge pump circuit will consume more power when charging the circuit, and is their shortcomings.

Many varieties of charge pump circuit were released to overcome the problem, for example the FIG. 2 shows an improved charge pump circuit 200 disclosed in U.S. Pat. No. 6,670,844. The charge pump circuit 200 includes depletion-type N-channel MOS transistors each having its gate and drain interconnected via a diode connection and individually having their respective sources and drains interconnected thereby defining multiple stages interconnected in cascade, and capacitor elements individually connected to the respective sources of the MOS transistors. The charge pump circuit 200 operates as follows. A given input voltage is applied to the drain and gate of the initial stage MOS transistor1. Then a clock signal and an inverted clock signal are alternately supplied to the MOS transistors via the respective capacitor elements so that a boosted voltage is obtained from the final stage MOS transistor. But at the switching of clock cycle, the characteristic of depletion-type MOS transistors cannot make the charge pump circuit 200 turned off as the voltage of node A is raised. Then a reverse current leakage Iq, which is equal to the effect of charging inefficiency caused by the threshold voltage of enhancement-type NMOS transistor in FIG. 1, decreases the system's efficiency. Furthermore, the overflow from reverse current leakage Iq sometimes damages the system and lowers the reliability; so the system need extra protect circuit to keep the reliability. In contrast, this causes the product's cost and disadvantages.

For reducing the reverse current leakage Iq, the improved charge pump circuit 200 changes the W/L ratio of the depletion-type NMOS transistors. But this way just minimizes the reverse current leakage Iq, and cannot stop it all. Besides the difficulties of manufacturing will increase the cost and the electronic interference, and make the reliability decreased.

For this reason, a charge pump circuit with the stable reliability and without reverse current in needed.

SUMMARY OF THE INVENTION

In order to solve the problems mentioned above, the present invention provides a charge-pump circuit using series connected equivalent diodes composed of depletion-type MOS transistor to avoid the threshold voltage loss to increase the efficiency of raising voltage thereon.

In one aspect of the invention, a charge-pump circuit is implemented. The charge-pump circuit includes a reverse current cut-off circuit to cut off the reverse current for enhancing the performance of raising voltage.

In another aspect of the invention, a charge-pump circuit with a reverse current cut-off circuit is implemented. The fabrication of the charge-pump circuit is straight and easy, and save the cost of production.

In another aspect of the invention, a charge-pump circuit with a reverse current cut-off circuit is implemented. The reverse current cut-off circuit c an cut off the reverse current to reduce the electronic interference.

In another aspect of the invention, a charge-pump circuit is implemented. The charge-pump circuit includes a voltage stabilizing circuit to output stable voltage.

In one embodiment, the charge-pump circuit includes: a plurality of diode equivalent networks connecting in series, between any two of the adjacent diode equivalent networks having a node with a corresponding voltage-boost level, wherein the low voltage end in the diode equivalent network with lowest voltage-boost level is the input of the charge-pump circuit, and the input receives an input voltage signal; at least a voltage-boost capacitor network having an end to electronically couple to one of the node and the other end to electronically couple to a pulse signal, wherein the pulse signal has a high-voltage level and a low-voltage level to raise a voltage level at the node with voltage-boost as the high-voltage level and the low-voltage level switch; and at least a reverse current cut-off circuit electronically coupled to the diode equivalent networks to enable and disable the diode equivalent networks, wherein the reverse current cut-off circuit has at least two conductive paths.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Figure 1:
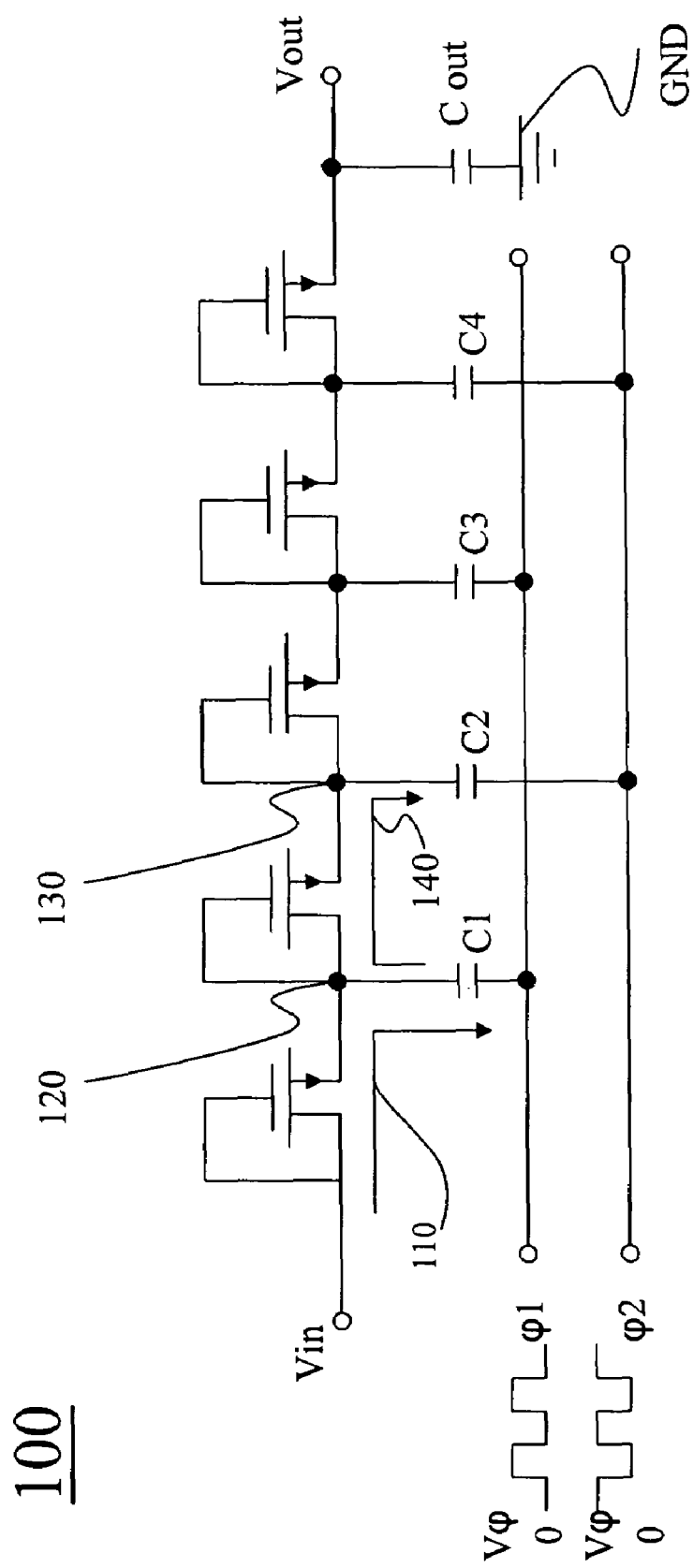
FIG. 1 is a circuit diagram of a conventional dual phase charge pump circuit.
Figure 2:
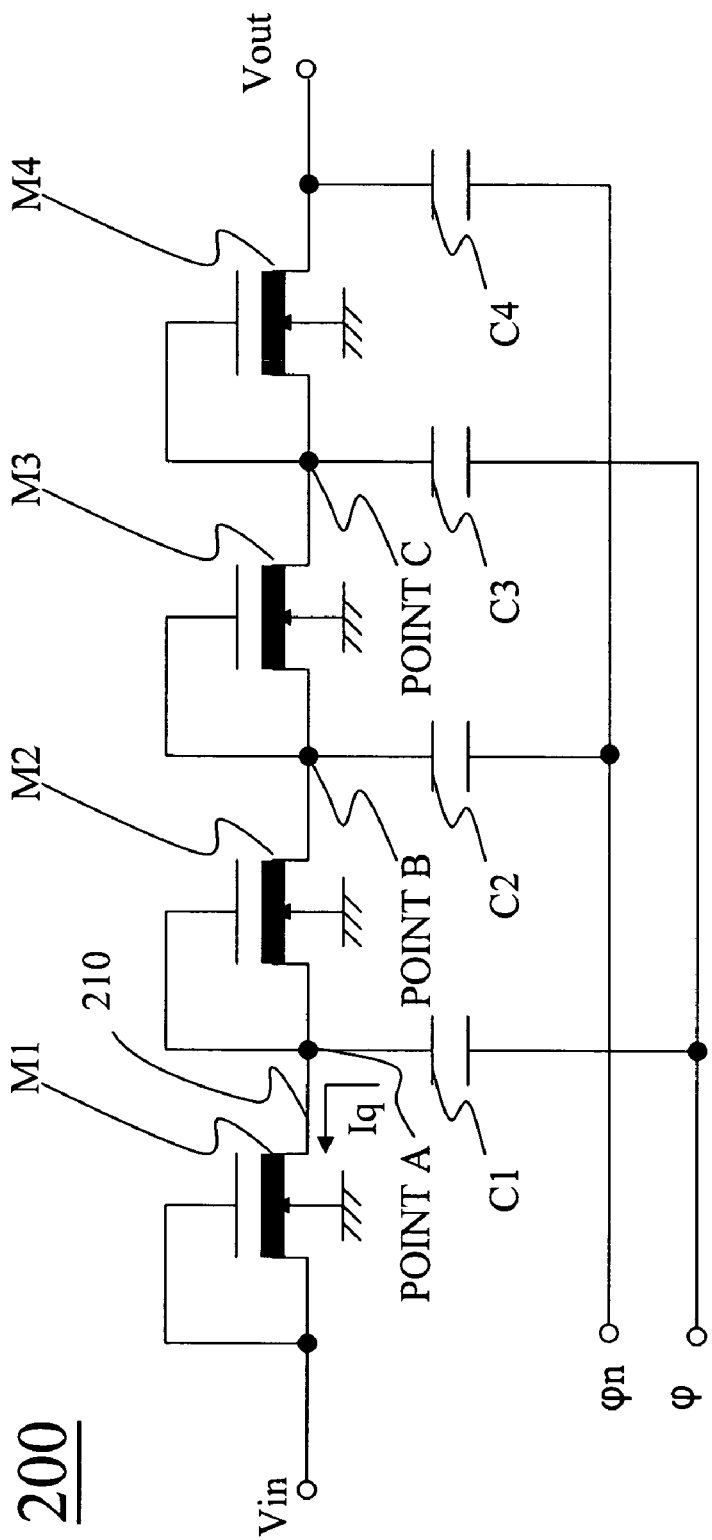
FIG. 2 is a circuit diagram of a conventional charge pump circuit.
Figure 3:
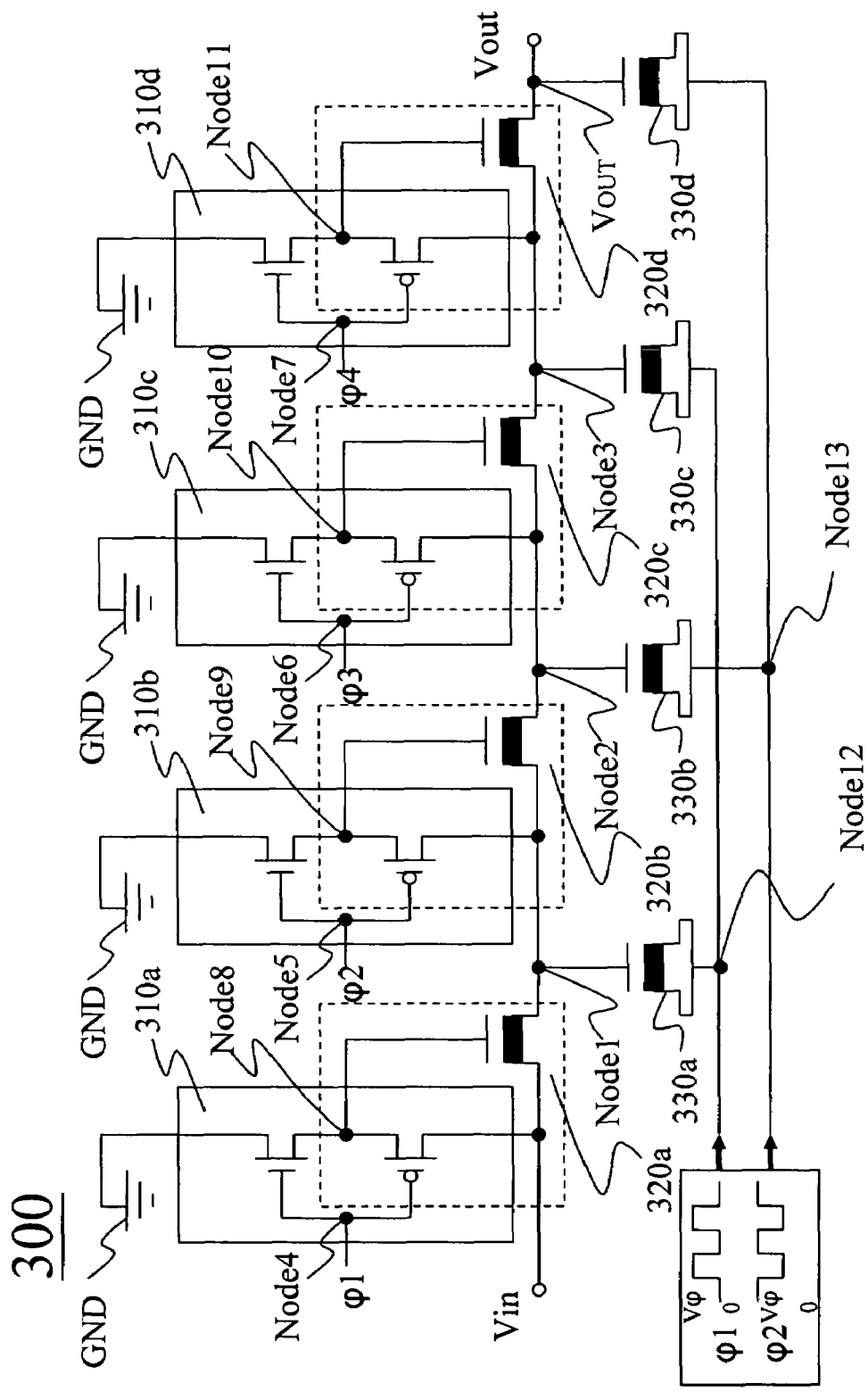
FIG. 3 is a circuit diagram of a 4-order charge-pump circuit in accordance with one embodiment of the present invention.

FIG. 3 is a 4-order charge-pump circuit in accordance with one embodiment of the present invention. The 4-order charge-pump circuit 300 includes a first reverse current cut-off circuit 310a, a second reverse current cut-off circuit 310b, a third reverse current cut-off circuit 310c, a fourth reverse current cut-off circuit 310d, a first equivalent diode 320a, a second equivalent diode 320b, a third equivalent diode 320c, a fourth equivalent diode 320d, a first voltage-boost capacitor 330a, a second voltage-boost capacitor 330b, a third voltage-boost capacitor 330c, and a fourth voltage-boost capacitor 330d, wherein every reverse current cut-off circuit 310 is made of a pair of switches. In this embodiment, the reverse current cut-off circuit 310 is made of, but not limited to, an enhancement-type NMOS transistor and an enhancement-type PMOS transistor. In other embodiments, the pair of switches can be any of switches having same characteristic of mutually opposite conductivity, like electromagnetic switches or semiconductor switches.

In every reverse current cut-off circuit 310 the enhancement-type NMOS transistor is electronically coupled to the enhancement-type PMOS transistor through source-to-source or drain-to-drain connection. Transistors in every reverse current cut-off circuit 310 have their gates connected to a common node. In addition, every equivalent diode 320 includes a depletion-type NMOS transistor and an enhancement-type PMOS transistor resided in the reverse current cut-off circuit 310. The voltage in the gate of enhancement-type PMOS transistor controls it's conduction, when the enhancement-type PMOS transistor is conductive and the enhancement-type NMOS transistor is cut-off, the gate and drain terminals can be considered an equivalent diode in connection. In this embodiment, the switch pair in the reverse current cut-off circuit 310 control the equivalent diode 320, which is composed of depletion-type NMOS transistor and the enhancement-type PMOS transistor resided in reverse current cut-off circuit 310, to enable or disable. In this embodiment the circuit formed by the gate and drain terminals of the depletion transistor can be replaced by an equivalent switch element. For example, a PMOS transistor or an enhancement-type PMOS transistor also can implement this switching function.

Accordingly, the equivalent diode 320 is a kind of diode equivalent network, and the voltage-boost capacitor can be seen as a voltage-boost capacitor network.

Furthermore, a terminal of the reverse current cut-off circuit 310 is electronically connected to the ground (GND) for the loop of reverse current cut-off circuit with the diode equivalent network to enable and disable. It is worth noted for the present invention that the ground can be any lower voltage level and not limited to zero.

Accordingly, the four-order charge-pump circuit 300 is described below: The first equivalent diode 320a connects to the second equivalent diode 320b in serial, and a first node Node1 is their connection point. The second equivalent diode 320b connects to the third equivalent diode 320c in serial, and a second node Node2 is their connection point. The third equivalent diode 320c connects to the fourth equivalent diode 320d in serial, and a first node Node3 is the connection point. The source terminal of fourth equivalent diode 320d is the fourth order's voltage output Vout.

In every reverse current cut-off circuit 310, the switch pair have their enhanced MOS transistor's gate electronically coupled together, thus a fourth node Node4, a fifth node Node5, a sixth node Node6, and a seventh node Node7 are formed.

In every reverse current cut-off circuit 310, both enhanced MOS transistors' gate or drain electronically are coupled together, thus an eighth node Node8, a ninth node Node9, a tenth node Node10, and an eleventh node Node11 are formed.

A first voltage-boost capacitor 330a is electronically coupled to Node1, a second voltage-boost capacitor 330b is electronically coupled to Node2, a third voltage-boost capacitor 330c is electronically coupled to Node3, and a fourth voltage-boost capacitor 330d is electronically coupled to the fourth order's voltage output Vout. The voltage-boost capacitor 330 is a depletion NMOS transistor having its source terminal electronically coupled to its drain terminal, but not limited to this implementation. Actually, any electric device or circuit with capacity value can be a voltage-boost capacitor. The first voltage-boost capacitor 330a has its source electronically coupled to its drain to be a twelfth node Node12, and the second voltage-boost capacitor 330b has its source electronically coupled to its drain to be a thirteenth node Node13. The twelfth node Node12 is the connection of source and drain of the third voltage-boost capacitor 330c, and the thirteenth node Node13 is the connection of source and drain of the fourth voltage-boost capacitor 330d. The nodes Node12 and Node13 respectively connect first impulse signal $\phi 1$ and second impulse signal $\phi 2$, which are mutual reverse to each other. The signal source's high and low level is reciprocal, and the low level is 0 and high level is V$\phi$. However the low level and high level can be adjusted according to the specification. The gates of voltage-boost capacitors 330 are respectively connected to the first node Node1, the second node Node2, the third node Node3 and the fourth order's output Vout.

Figure 4:
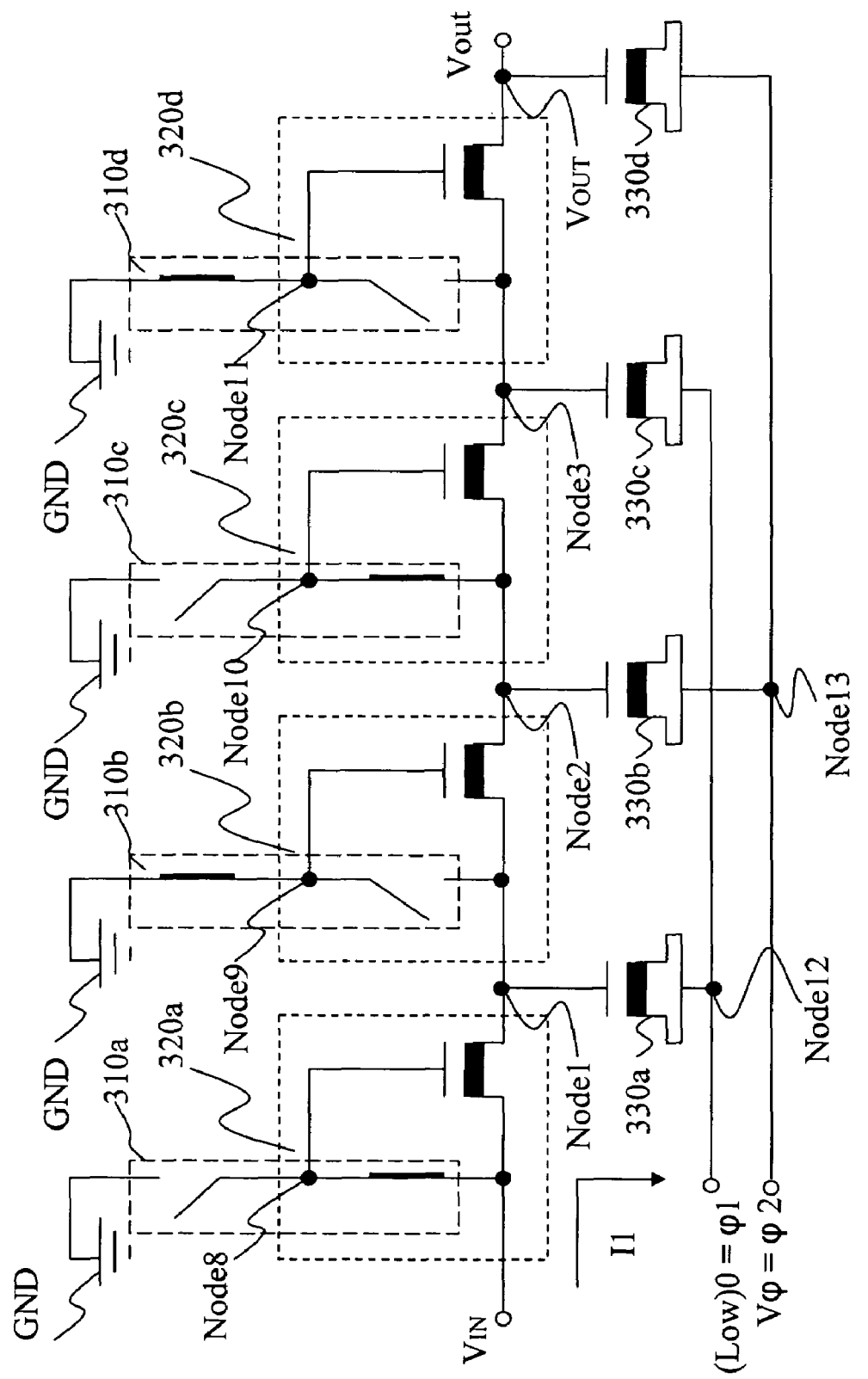
FIG. 4 is a circuit diagram of a 4-order charge-pump circuit in first input state according to one embodiment of the present invention.

Accordingly, the 4-order charge-pump circuit's 300 operation is described below:

The FIG. 4 discloses an equivalent circuit of 4-order charge-pump circuit in first input state according to FIG. 3. In first input state, an input voltage signal Vin is transferred to the charge-pump circuit 300, $\phi 1$ is 0 (ground) or low voltage and $\phi 2$ is high voltage V$\phi$. In the reverse current cut-off circuit 310, the switch pair turn on or turn off according to the input voltage signal Vin, thus forming two conductive paths. The depletion NMOS transistor with the equivalent diodes 320a and 320c has its gate and source diode-connected to form a closed loop. The depletion NMOS transistor with the equivalent diodes 320b and 320d makes its gate and source open, thus the depletion NMOS transistor is not diode-connected and the equivalent diodes 320b and 320d are disable in the first input state.

The depletion NMOS transistor in the equivalent diode 320a is closed, thus the input voltage Vin generates charge current I1 to the capacitor 330a until the Node1's voltage Vnode1=Vin.

Figure 5:
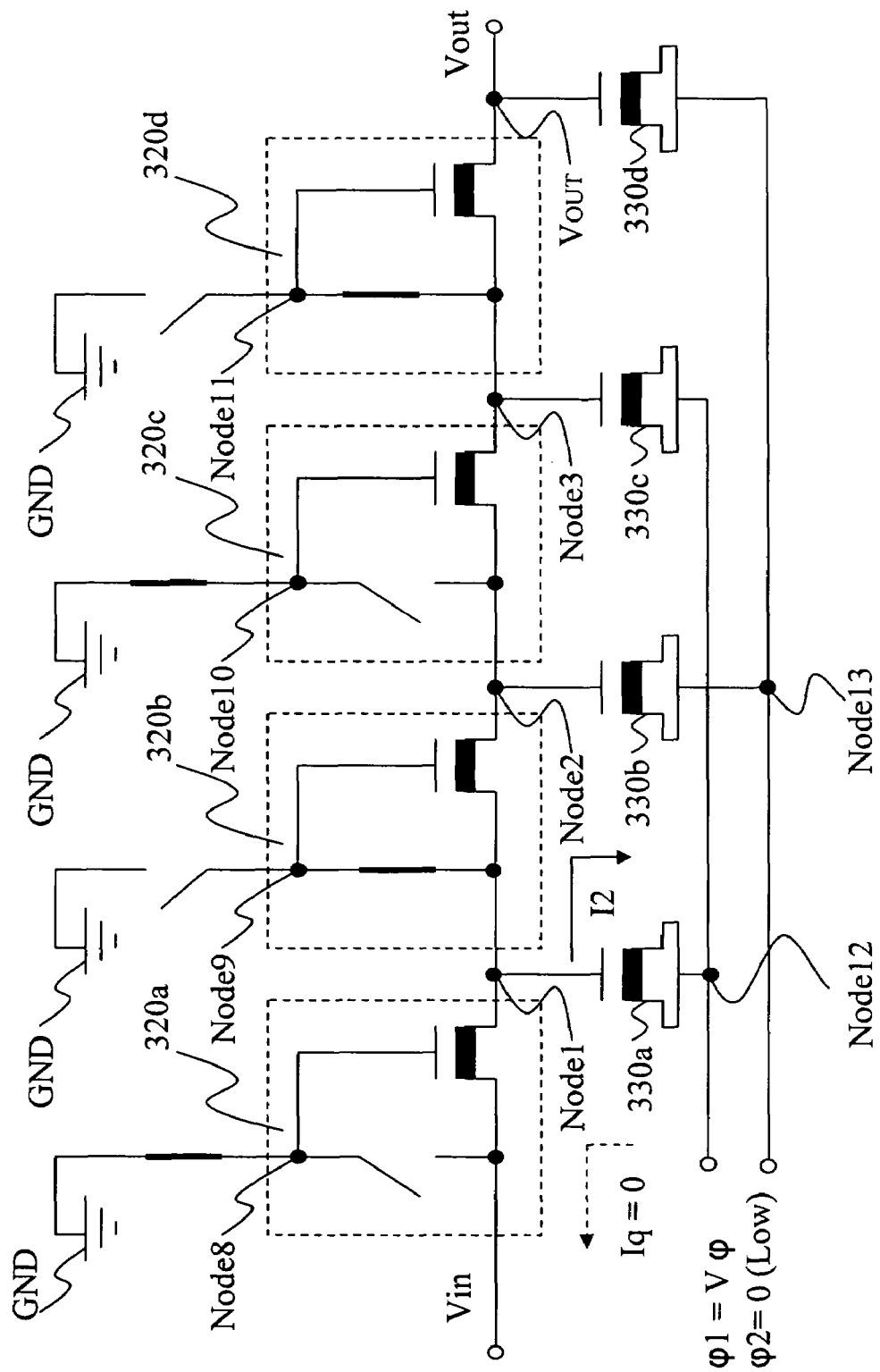
FIG. 5 is a circuit diagram of a charge-pump circuit in second input state according to one embodiment of the present invention.

The FIG. 5 discloses an equivalent circuit of 4-order charge-pump circuit 300 in second input state according to FIG. 3. In second input state, an input voltage signal Vin is transferred to the charge-pump circuit 300, φ1 is V φ and φ2 is 0 (ground or low level). In the reverse current cut-off circuit 310, the switch pair turn on or turn off according to the input voltage signal Vin, thus forming two conductive paths. The depletion NMOS transistor with the equivalent diodes 320b and 320d has its gate and source forming closed loop and is diode-connected. The depletion NMOS transistor with the equivalent diodes 320a and 320c has its gate and source open, thus the depletion N-channel transistor is not diode-connected and the equivalent diodes 320a and 320c are disable in the second input state. The first impulse signal φ1 is input to the Node12, so the voltage of first voltage-boost capacitor 330a is raised a V φ level and the voltage Vnode1 in Node1 is raised to Vin+V φlevel. The second equivalent diode 320b is conducted owing to diode-connected, and through the loop to generate a charge current I2 to the capacitor 330b, then the voltage Vnode2 is raised to Vin+V φ. Most noticeably, in the conventional circuits since the voltage of Vnode1 is greater than Vin, a reverse current Iq is occurred in the charge-pump circuit 300. in this embodiment the gate of depletion NMOS transistor is coupled to the ground because of the switch pair. If a reverse current is generated, the depletion NMOS transistor's source in the equivalent diode 320a is the voltage Vin of node owing to the direction of reverse current Iq. The depletion NMOS transistor's source in the equivalent diode 320a has gate-source voltage Vgs1=−Vin. If gate-source voltage of the depletion NMOS transistor smaller than its threshold voltage Vt, means Vgs1<Vt, no reverse current happens. That is the way the charge-pump circuit 300 enhances the efficiency and reduces the cost.

Figure 6:
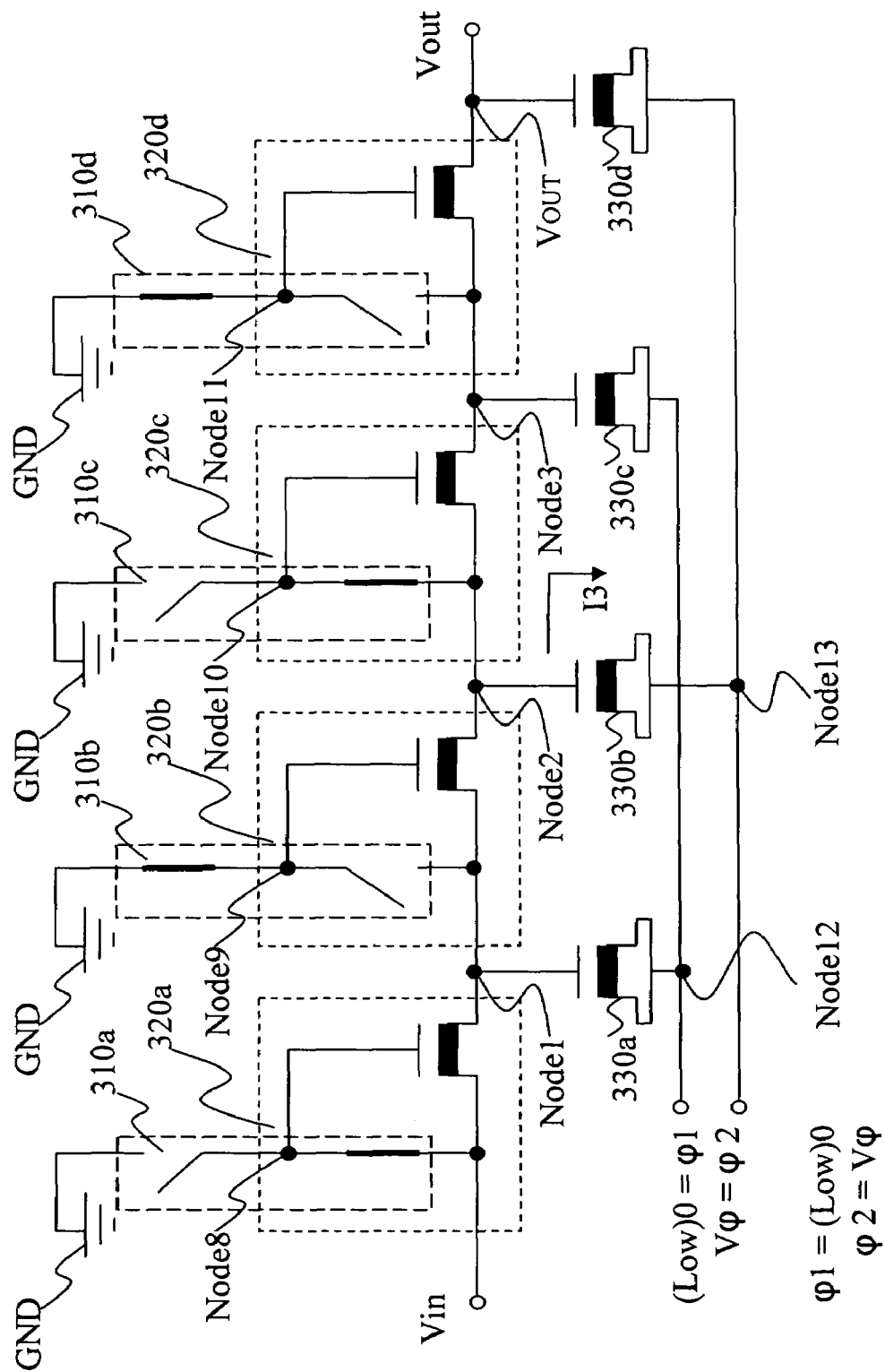
FIG. 6 is a circuit diagram of a 4-order charge-pump circuit in first input state in accordance with one embodiment of the present invention.

Referring the FIG. 6 is the 4-order charge-pump circuit in first input state after second input state, and the second pulse signal φ2=Vφ. Node2 will be raised a V φ voltage level in the same operation described before, so Vnode2=Vin+2V φ. The third diode equivalent network in the depletion NMOS transistor turns on or off according to the third reverse current cut-off circuit 310c switching, thus forming two conductive paths. Through this loop a charge current charges the capacitor 330c to Vnode3=Vin+2V φ Besides, as the voltage of Vnode1 backs to Vin (Vgs2=−Vin), the gate-source voltage of the depletion NMOS transistor smaller than its threshold voltage Vt, means Vgs1<Vt, no reverse current occurs. The second equivalent diode 320b turns off and sustains the voltage of Node2 and Node3.

Figure 7:
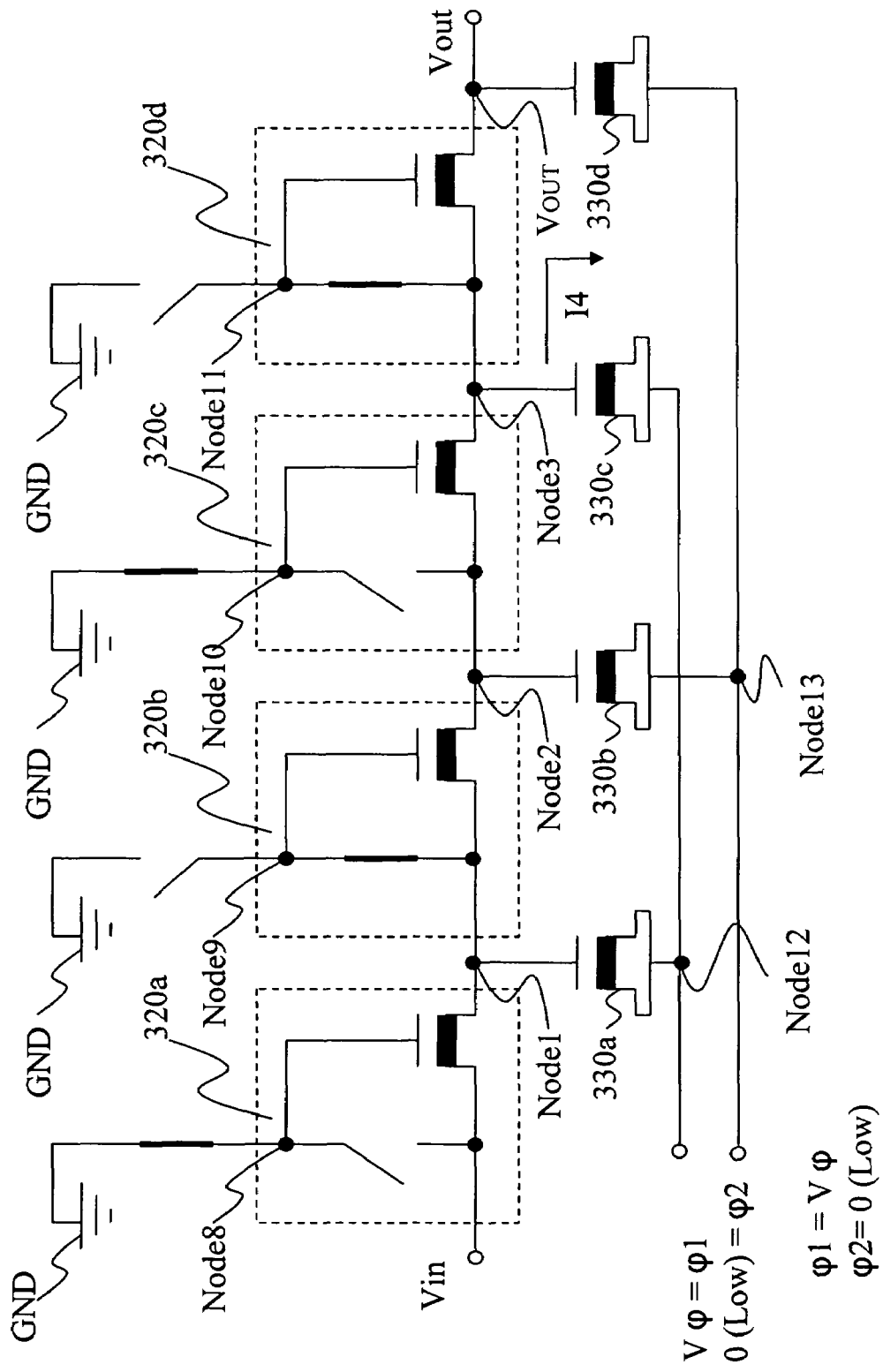
FIG. 7 is a circuit diagram of a 4-order charge-pump circuit in second input state in accordance with one embodiment of the present invention.

Referring the FIG. 7 is the 4-order charge-pump circuit in second input state after first input state, and the second pulse signal φ1=V φ. The first pulse signal φ1=V φ is input to node Node12 and the voltage of third voltage-boost capacitor is raised a V φ level, the voltage of Node3 Vnode3 also raised to Vin+3V φ. The depletion NMOS transistor in the fourth equivalent diode 320d is diode-connected, Through this loop a charge current 14 charges the capacitor 330d from Vout to Vin+3V φ. When the pulse signal retunes back to the second pulse signal, the capacitor 330d is raised a voltage V φ and causes output voltage being boosted to Vout=Vin+4V φ.

Most noticeably, the reverse current cut-off circuit may utilize any electrical device or circuit with conductive characteristic similar to those mentioned above. That electrical device or circuit is capable of changing conduction path in response to the input pulse signal for avoiding the reverse current leakage. Therefore, the present invention implements the reverse current cut-off circuit by using an enhancement-type NMOS transistor and an enhancement-type PMOS transistor, but it is not only embodiment for the present invention.

The present invention uses the switch with opposite electricity to form a reverse current cut-off circuit. This can avoid the reverse current caused by raising voltage, save electrical energy and promote the reliability.

This is summarized as follows: the output voltage of a N-order charge-pump circuit is showed in equation (2-1)

$$Vout=Vin+N*V\phi \qquad (2\text{-}1)$$

The N-order charge-pump circuit's 300 order in series can be adjusted upon the requirements until the Pumping Voltage Gain reach to the saturation. In other words, before the Pumping Voltage Gain reaches to the saturation, the charge-pump circuit's orders are adjusted according the specification. The 4-order charge-pump circuit is not the only embodiment for the present invention.

The present invention can avoid the threshold voltage of conventional charge-pump circuit and the reverse current which causes inefficiency to the system. The disclosed charge-pump circuit utilizes the pulse signal of the circuit to switch the conductive path in order to cut off the reverse current without complicate design in the manufacturing process for the circuit. Therefore, the present invention can fit in the Mobile/Hand-Held Device, which is in need of power management for low voltage and limited power supply, to save electrical energy and increase the efficiency of raising voltage and promote the reliability.

Most noticeably, the charge-pump circuit 300 can connect a regulator to the input to receive a stable input voltage. When the input power supply decay or vary, the charge-pump circuit 300 still can have a stable input voltage.

Besides, previous described circuits and elements in compound of charge-pump circuit are just to show the preferred embodiments and not to limit the spirit of the present invention. For example, any equivalent network composed of number of elements should belong to the scope of the present invention. In addition, the skilled in the art should understand the network topology disclosed has other implementation with the idea that the reverse current cut-off circuit combined with equivalent diode. For instance, the depletion N-channel transistor may use the JFET instead. In some system, the present invention can be a relative ground for a negative charge-pump circuit, whose input voltage is a negative input voltage, and a depletion P-channel transistor is used in the present invention. Although the present invention has been explained in relation to its preferred embodiment, it is to be understood that other modifications and variation can be made without departing the spirit and scope of the invention as hereafter claimed.

What is claimed is:

1. A charge-pump circuit for outputting a output voltage signal that is higher than an input voltage signal, comprising:
   a plurality of diode equivalent networks connected in a sequence, between any two of said adjacent diode equivalent networks having a node with a corresponding voltage-boost level, wherein the low voltage end in said diode equivalent network with lowest voltage-boost level is the input of said charge-pump circuit, and said input receives the input voltage signal, a last node at the end of the sequence of the plurality of diode equivalent networks being the output node of the charge-pump circuit;

at least a voltage-boost capacitor network having an end to electronically couple to one of said node and the other end to electronically couple to an impulse signal, wherein said impulse signal has a high-voltage level and a low-voltage level to raise a voltage level at said node with voltage-boost as said high-voltage level and said low-voltage level switch; and at least a reverse current cut-off circuit electronically coupled to said diode equivalent networks to enable and disable said diode equivalent networks, wherein said reverse current cut-off circuit has at least two conductive paths and receives the impulse signal that determines conductivity of each conductive path, wherein the output voltage at the output node of the charge-pump circuit being the input voltage boosted by the voltage-boost level provided by each node.

2. The charge-pump circuit of claim 1, wherein said conductive paths open according to the switching of said impulse signal at voltage-boost level to avoid reverse current in said charge-pump circuit.

3. The charge-pump circuit of claim 1, wherein said adjacent node's phase of said impulse signal are adverse.

4. The charge-pump circuit of claim 1, wherein said reverse current cut-off circuit comprises two electronic switching networks with opposite conductive characteristic, as said impulse signal switches voltage level to make one of said electronic switching networks closed and the other one open.

5. The charge-pump circuit of claim 1, wherein every said diode equivalent network is composed of a depletion-type NMOS transistor and one of said electronic switching networks in said reverse current cut-off circuit, said depletion-type NMOS transistor is diode connected.

6. The charge-pump circuit of claim 1, wherein said reverse current cut-off circuit comprises an enhancement-type NMOS transistor and an enhancement-type PMOS transistor, as said corresponding voltage-boost level inputs a low level voltage, said enhancement-type PMOS transistor is closed and said enhancement-type NMOS transistor is cut-off; as said corresponding voltage-boost level inputs a high level voltage, said enhancement-type PMOS transistor is cut-off and said enhancement-type NMOS transistor is closed.

7. The charge-pump circuit of claim 6, wherein said enhancement-type PMOS transistor's source receives said input voltage signal, and gates of enhancement-type PMOS transistor and enhancement-type NMOS transistor receive relative said impulse signal input from said voltage-boost level.

8. The charge-pump circuit of claim 1, wherein the at least a voltage-boost capacitor network has a depletion-type transistor with source and drain connected.

9. The charge-pump circuit of claim 1, wherein the at least a voltage-boost capacitor network has a junction field effect transistor (JFET) with source and drain connected.

10. The charge-pump circuit of claim 1, wherein every said diode equivalent network is a junction field effect transistor (JFET), said junction field effect transistor is electronically diode-connected to corresponding said reverse current cut-off circuit.

11. A voltage-boost circuit used in the charge-pumper, comprising:

an equivalent diode network receiving an input voltage;

a capacitor network electronically coupled to said equivalent diode network, outputting a voltage higher than said input voltage by an impulse signal; and a pair of switches electronically coupled to said equivalent diode network to enable or disable said equivalent diode network, wherein the pair of switches having a common input receiving the impulse signal.

12. The voltage-boost circuit of claim 11, wherein said pair of switches has an end electronically coupled to the ground.

13. The voltage-boost circuit of claim 12, wherein said the voltage on said ground is not limited to zero.

14. The voltage-boost circuit of claim 11, wherein said pair of switches are configured to control conductive path by said impulse signal, said pair of switches have at least two conductive paths, and said impulse signal has at least two corresponding signal status.

15. The voltage-boost circuit of claim 14, wherein said conductive paths closed and open in turn according to said impulse signal.

16. The voltage-boost circuit of claim 14, wherein said conductive paths closed and open in turn for cutting off the reverse current.

17. The voltage-boost circuit of claim 14, wherein said impulse signal has a high-voltage signal status and a low-voltage signal status.

* * * * *